(12) United States Patent
Kim

(10) Patent No.: US 12,113,917 B2
(45) Date of Patent: Oct. 8, 2024

(54) SYSTEM AND METHOD FOR BLOCKCHAIN PLATFORM-BASED SERVICE

(71) Applicant: DATA ALLIANCE CO., LTD., Seoul (KR)

(72) Inventor: Nam Gyun Kim, Seoul (KR)

(73) Assignee: DATA ALLIANCE CO., LTD., Seoul (KR)

( * ) Notice: Subject to any disclaimer, the term of this patent is extended or adjusted under 35 U.S.C. 154(b) by 526 days.

(21) Appl. No.: 17/432,627

(22) PCT Filed: Feb. 25, 2019

(86) PCT No.: PCT/KR2019/002267
§ 371 (c)(1),
(2) Date: Oct. 12, 2021

(87) PCT Pub. No.: WO2020/171272
PCT Pub. Date: Aug. 27, 2020

(65) Prior Publication Data
US 2022/0150077 A1 May 12, 2022

(30) Foreign Application Priority Data
Feb. 21, 2019 (KR) ........................ 10-2019-0020682

(51) Int. Cl.
*H04L 9/32* (2006.01)
*H04L 9/08* (2006.01)
*H04L 9/00* (2022.01)

(52) U.S. Cl.
CPC .......... *H04L 9/3265* (2013.01); *H04L 9/0825* (2013.01); *H04L 9/3247* (2013.01); *H04L 9/50* (2022.05)

(58) Field of Classification Search
None
See application file for complete search history.

(56) References Cited

U.S. PATENT DOCUMENTS 10,102,526 B1 * 10/2018 Madisetti ............. G06Q 20/389
2003/0154376 A1 8/2003 Hwangbo
(Continued)

FOREIGN PATENT DOCUMENTS

| KR | 101637854 B1 | 7/2016 |
| KR | 101637863 B1 | 7/2016 |

(Continued)

OTHER PUBLICATIONS

Al-Bassam, SCPKI: A Smart Contract-based PKI and Identity System, 2017, ACM, 6 Pages (Year: 2017).*

(Continued)

*Primary Examiner* — Christopher C Harris
(74) *Attorney, Agent, or Firm* — Rabin & Berdo, P.C.

(57) ABSTRACT

The present disclosure relates to a system and a method for a blockchain platform-based service, the method including generating, at a smart contract deployed on a blockchain platform, a pair of a first private key and a first public key, transmitting the first public key generated at the smart contract to a first computing device, receiving, at the smart contract, data encrypted with the first public key at the first computing device, decrypting, at the smart contract, the encrypted data with the first private key, and storing, at the smart contract, the data decrypted with the first private key as a local variable of the smart contract.

10 Claims, 3 Drawing Sheets

(56) References Cited

U.S. PATENT DOCUMENTS

2017/0346639 A1* 11/2017 Muftic .................. H04L 9/3247
2019/0164157 A1*  5/2019 Balaraman ............ H04L 9/3297
2019/0363896 A1* 11/2019 Finlow-Bates ........ G06Q 20/36
2020/0143337 A1*  5/2020 Conroy ................ G06Q 20/382
2023/0419308 A1* 12/2023 Madisetti ............. G06Q 20/381

FOREIGN PATENT DOCUMENTS

KR    1020180041054 A    4/2018
KR    1020180129027 A   12/2018

OTHER PUBLICATIONS

Ahmed et al, Turning trust around: Smart Contract-assisted Public Key Infrastructure, 2018, IEEE, 8 Pages (Year: 2018).*
"Digital content management platform using blockchain", Hot Issue on the R&D, Newsletter, May 24, 2018, pp. 1-6, vol. 9-1.

* cited by examiner

SYSTEM AND METHOD FOR BLOCKCHAIN PLATFORM-BASED SERVICE

TECHNICAL FIELD

The present disclosure relates to a system and a method for a blockchain platform-based service, and more particularly, to a system and a method configured to safely deliver data to a smart contract deployed and executed on a blockchain platform, and issue a certificate using the smart contract.

BACKGROUND ART

Recently, the blockchain technology is receiving increasing attention, which is a distributed data storage technology that contains data in blocks that are linked together in a chain form, thus replicating and storing data in numerous computers simultaneously. The blockchain is also called as public transaction ledger. As is known, rather than storing the transaction history at a centralized server, the transaction details are sent to all users participating in the transaction, enabling all transaction participants to share and compare the information in every transaction, thus providing resilience to data forgery or tampering.

The smart contract was first suggested in 1994 by Nick Szabo who created the smart contract as a protocol that enforces compliance with highly developed contract in an untrusted computer Internet environment, providing greater security than the existing contract-related laws in real world and simultaneously processing contracts at a lower cost.

Ethereum adopted the concept of the smart contract devised by Nick Szabo and developed an application that stores "smart contract" formed of codes by programming in the blockchain platform, and execute it on each node of the blockchain platform and reflects the transaction details based on the execution result to the block.

Therefore, using the smart contract, it is possible to provide various types of services agreed upon by various forms of participants, such as financial transactions, real estate contracts, notarizations, and so on based on blockchain.

Meanwhile, there is difficulty in establishing a system that issues certificates on the blockchain platform using smart contracts. For the smart contract to perform the role of a certificate authority, it is necessary to own a private key of a certificate authority in the smart contract. However, since every blockchain participant should be allowed to verify and audit the smart contracts and transactions on the blockchain, a new method is required, which can ensure that the private key in the smart contract is not exposed.

SUMMARY

Technical Problem

It is a technical objective of the present disclosure to provide a system and a method which can safely deliver data to a smart contract deployed and executed on a blockchain platform and issue a certificate using the smart contract.

Technical Solution

According to an embodiment of the present disclosure, there is provided a system for a blockchain platform-based service, which may include a smart contract that is deployed on a blockchain platform and generates a pair of a first private key and a first public key, and a first computing device that receives the first public key generated in the smart contract and transmits data encrypted with the first public key to the smart contract.

The smart contract may decrypt the data encrypted with the first public key with the first private key, and store the data decrypted with the first private key as a local variable of the smart contract.

The data encrypted with the first public key may be a private key of a certificate authority. The smart contract may issue a certificate that is electronically signed with the private key of the certificate authority stored as the local variable of the smart contract to the blockchain platform.

The smart contract may receive personal information and a public key of a certificate issuance requester from a second computing device, and issues the certificate by electronically signing a certificate including personal information and a public key of the certificate issuance requester with the private key of the certificate authority.

The smart contract may store the issued certificate in the blockchain platform.

According to an embodiment of the present disclosure, there is provided a method for a blockchain platform-based service, which may include generating, at a smart contract deployed on a blockchain platform, a pair of a first private key and a first public key, transmitting the first public key generated at the smart contract to a first computing device, receiving, at the smart contract, data encrypted with the first public key at the first computing device, decrypting, at the smart contract, the encrypted data with the first private key, and storing, at the smart contract, the data decrypted with the first private key as a local variable of the smart contract.

Advantageous Effects

According to the present disclosure, a system and a method, which can safely deliver data to a smart contract deployed and executed on a blockchain platform and issue a certificate using the smart contract, can be provided.

DETAILED DESCRIPTION

Figure 1:
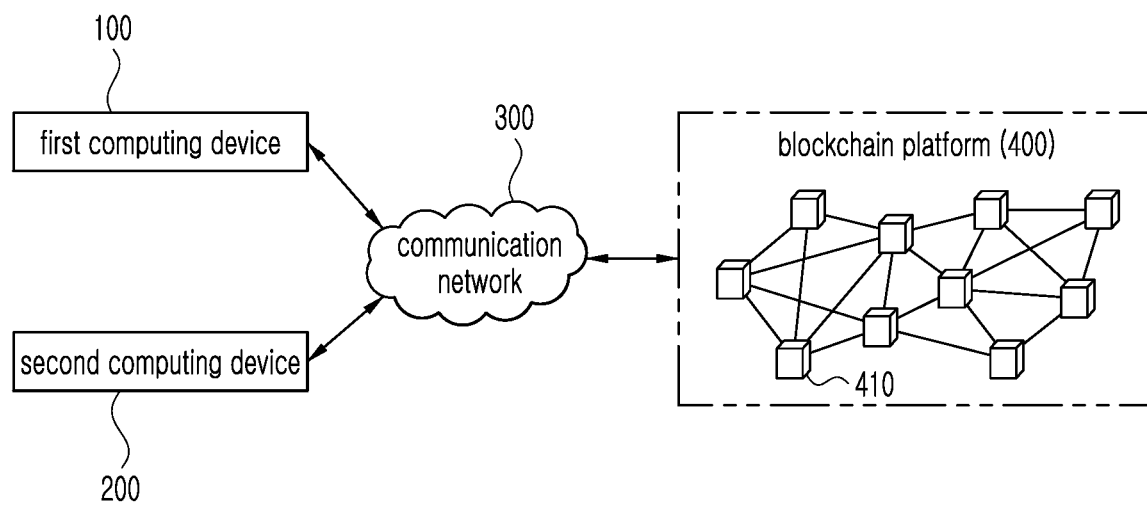
FIG. 1 illustrates a configuration of a system for a blockchain platform-based service according to an embodiment of the present disclosure.

Hereinafter, preferred embodiments of the present disclosure will be described in detail with reference to the accompanying drawings so that those with ordinary knowledge in the art can easily achieve the present disclosure. However, the description proposed herein is just a preferable example for the purpose of illustrations only, not intended to limit the scope of the disclosure, so it should be understood that other equivalents and modifications could be made thereto without departing from the scope of the disclosure. In the following description, the functions or elements irrelevant to the present disclosure will not be described for the sake of clarity, and the like reference numerals are used to denote the same or similar elements in the description and drawings.

Throughout the description, when a portion is stated as "comprising (including)" an element, unless specified to the contrary, it intends to mean that the portion may additionally include another element, rather than excluding the same.

In addition, the terms "unit" and "module" described herein mean a unit of processing at least one function or operation, and may be implemented as hardware or software or combination of hardware and software.

FIG. 1 illustrates a configuration of a system for a blockchain platform-based service according to an embodiment of the present disclosure.

Referring to FIG. 1, the system for a blockchain platform-based service according to the present disclosure may include a first computing device 100, a second computing device 200, and a blockchain platform 400.

The first computing device 100, the second computing device 200, and the blockchain platform 400 may exchange various types of information and data through a communication network 300.

The communication network 300 includes a local area network (LAN), a metropolitan area network (MAN), a wide area network (WAN), the Internet, 2G, 3G, 4G, 5G mobile communication networks, Bluetooth, Wi-Fi, Wibro, satellite communication networks, LPWA (Low Power Wide Area) network such as LoRa, Sigfox, and so on. Further, the communication method is not limited to whether it is wire or wireless, and any communication method may be used.

The first computing device 100 and the second computing device 200 may include a notebook computer, a desktop computer, a laptop computer, a server computer, a smartphone, a tablet computer, and so on, but not limited thereto, and may include all types of devices with a processor and communication means.

The first computing device 100 and the second computing device 200 may operate as participating nodes 410 of the blockchain platform 400.

For convenience of explanation, only one of the first computing device 100 and the second computing device 200 is illustrated in FIG. 1, but a plurality of computing devices may connect to the blockchain platform 400 and exchange data and information.

The blockchain platform 400 represents a P2P structure network including a plurality of nodes 410 operating according to blockchain algorithms. The nodes 410 herein represent the subjects that participate in the blockchain network and maintain and manage blockchain data based on the blockchain algorithms. The node 410 may be implemented as a computing device, but may also be implemented as a virtual machine or the like.

In response to a request to process transaction generated in the blockchain, each node 410 of the blockchain platform 400 verifies the validity of the transaction, records the verified transaction in new block data, and propagates to each node 410 of the blockchain platform 400. The transaction may herein include processing various types of information generated on the blockchain platform 400.

Each node 410 of the blockchain platform 400 stores blockchain data that is a ledger shared by consensus algorithms determined respectively, and the blockchain data may be formed in a chain form in which a plurality of block data are linked.

Meanwhile, the blockchain platform 400 may provide a so-called "smart contract" function and a "dApp" (decentralized application) function based on the smart contract.

The smart contract herein is a program code that is deployed on the blockchain platform 400 and executed as being included in the block of the blockchain data. The smart contract may be executed by external applications or services or other smart contracts.

Each node 410 of the blockchain platform 400 may include a virtual machine for executing the smart contract. For this purpose, although it may vary depending on embodiments, the smart contract may be compiled into byte code executable in a virtual machine, and deployed on the blockchain platform 400 and stored in the blockchain data. The byte code of the smart contract may be substituted for the Op code in the virtual machine and executed.

Figure 2:
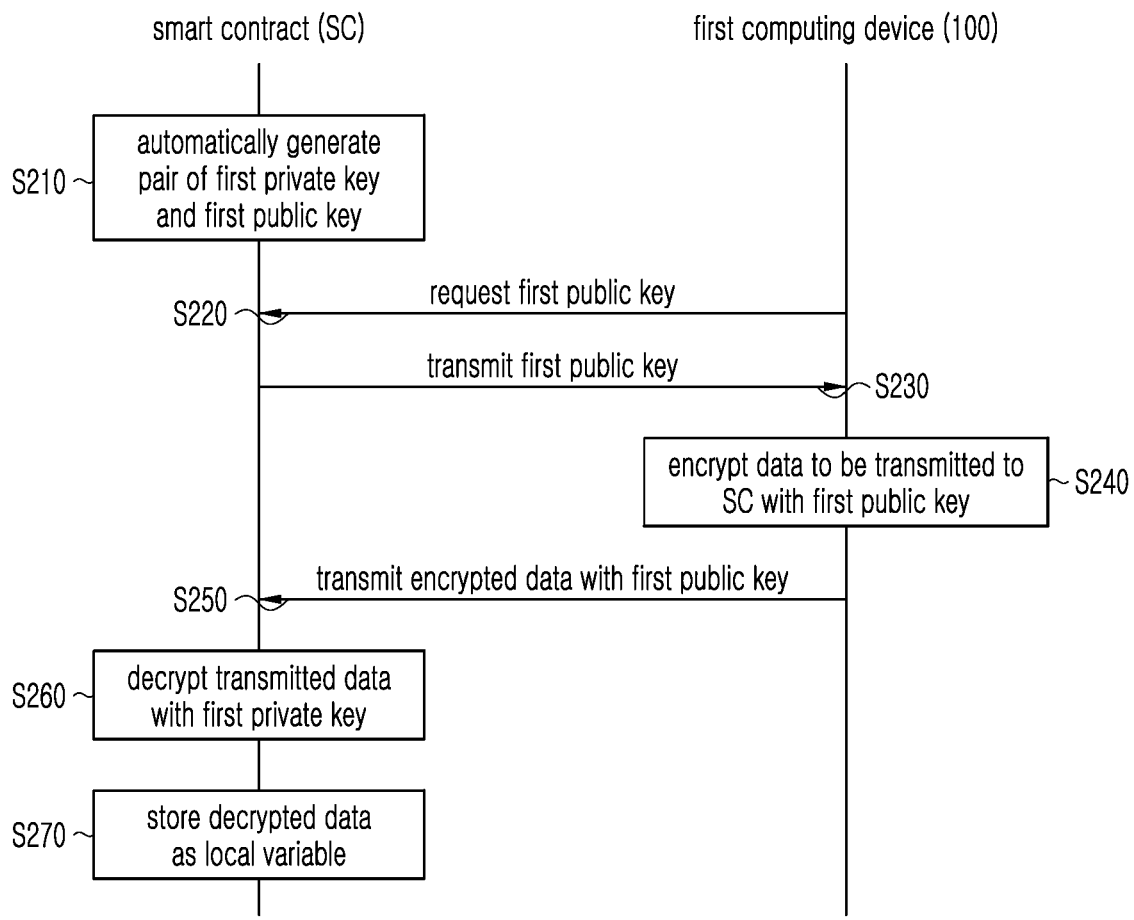
FIG. 2 is a diagram provided to explain a method for safely delivering data to a smart contract that is deployed and executed on a blockchain platform according to an embodiment of the present disclosure.

FIG. 2 is a diagram provided to explain a method for safely delivering data to a smart contract that is deployed and executed on a blockchain platform according to an embodiment of the present disclosure.

Referring to FIG. 2, the smart contract (SC) deployed on the blockchain platform 400 and included in the blockchain data may first generate a pair of a first private key and a first public key, at S210. The operation S210 may be implemented to be automatically executed when the smart contract (SC) is deployed on the blockchain platform 400 and included in the blockchain data. The first private key generated at S210 is stored as a local variable of the smart contract (SC).

Next, upon receiving a request for the first public key from the first computing device 100 at S220, the smart contract (SC) at S230 may transmit the first public key to the first computing device 100 that requested the first public key.

Then, the first computing device 100 receiving the first public key may encrypt the data to be transmitted to the smart contract (SC) with the first public key, at S240. Further, the first computing device 100 may transmit the data encrypted with the first public key to the smart contract (SC) through the nodes 410, at S250.

Next, the smart contract (SC) may decrypt the data delivered at S250 using the first private key at S260.

The smart contract (SC) may store the data decrypted at S260 as a local variable to prevent exposure to the outside, at S270.

Figure 3:
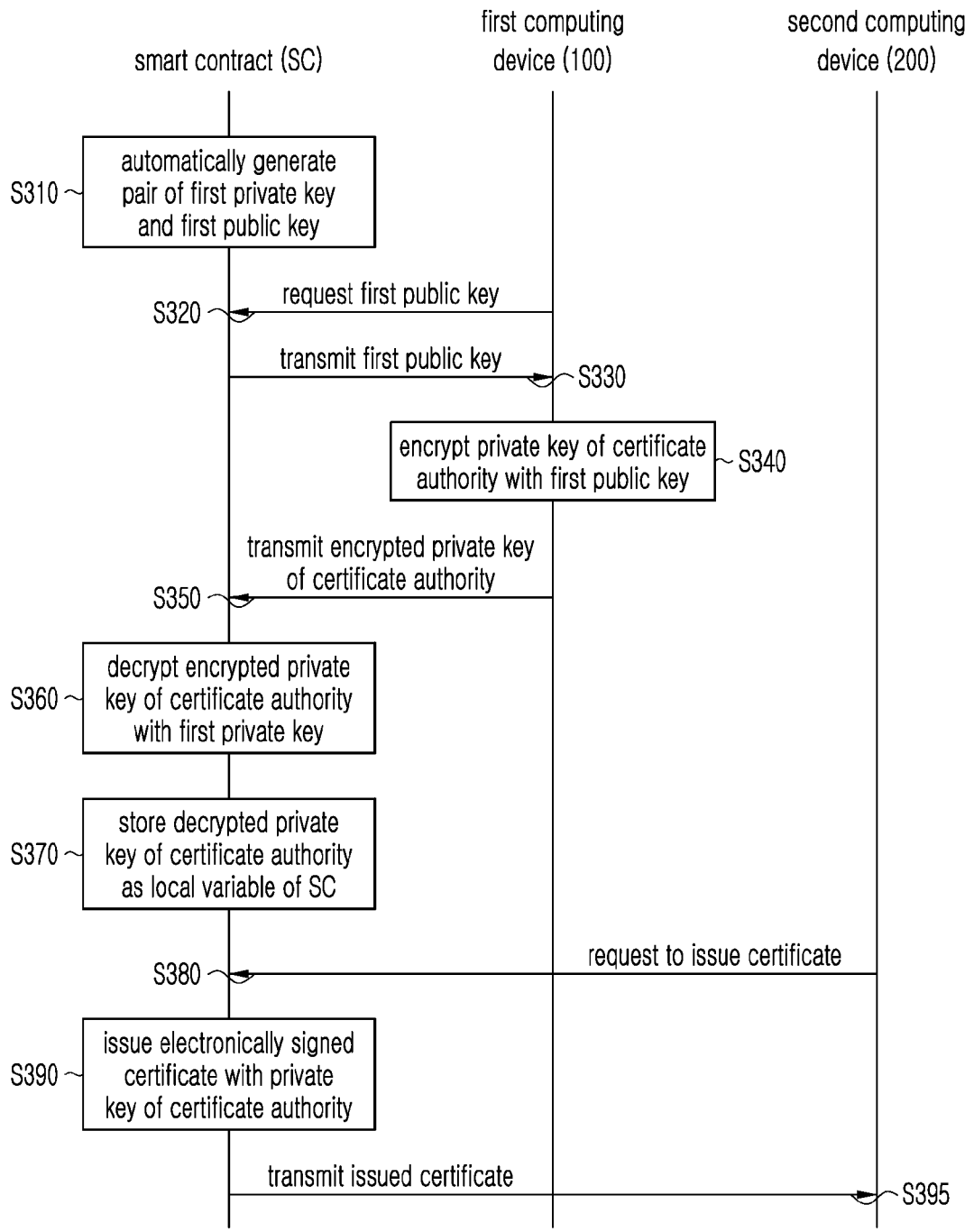
FIG. 3 is a diagram provided to explain a method for a blockchain platform-based authentication service according to an embodiment of the present disclosure.

FIG. 3 is a diagram provided to explain a method for a blockchain platform-based authentication service according to an embodiment of the present disclosure.

In the embodiment of FIG. 3, a smart contract (SC') may be executed on the blockchain platform 400 to issue a certificate. The certificate issued by the smart contract (SC') may be electronically signed with the private key of the certificate authority. While the contents of the certificate may vary depending on embodiments, a certain example may include personal information of a certificate issuance requester, a public key of the certificate issuance requester, and so on.

In the embodiment of FIG. 3, the first computing device 100 may be used by a subject that generates and deploys a smart contract (SC') on the blockchain platform 400. The second computing device 200 may be used by the certificate issuance requester who intends to receive a certificate issued from the smart contract (SC').

According to an embodiment, the certificate authority may directly deploy the smart contract (SC') on the blockchain platform 400, but the smart contract (SC') may be deployed on the blockchain platform 400 by a separate subject. In the following description, it is assumed that the certificate authority directly deploys the smart contract (SC') on the blockchain platform 400.

Referring to FIG. 3, the smart contract (SC') deployed on the blockchain platform 400 may generate a pair of a first private key and a first public key, at S310. The operation S310 may be implemented to be automatically executed when the smart contract (SC') is deployed on the blockchain platform 400 and included in the blockchain data. The first private key generated at S310 is stored as a local variable of the smart contract (SC').

Next, upon receiving a request for the first public key from the first computing device 100 at S320, the smart contract (SC') at S330 may transmit the first public key to the first computing device 100.

Then, at S340, the first computing device 100 may encrypt the private key of the certificate authority to be transmitted to the smart contract (SC') by using the first public key transmitted at S320. The first computing device 100 may transmit the private key of the certificate authority encrypted using the first public key to the smart contract (SC') through the node 410, at S350.

Next, at S360, the smart contract (SC') may decrypt the private key of the certificate authority encrypted and delivered at S330 by using the first private key. The smart contract (SC') may store the private key of the certificate authority decrypted at S335 as a local variable to prevent exposure to the outside, at S370.

Then, when receiving a certificate issuance request from the second computing device 200 at S380, the smart contract (SC') at S390 may issue an electronically signed certificate using the private key of the certificate authority which is stored as the local variable of the smart contract (SC').

The certificate issued by the smart contract (SC') may be transmitted to the second computing device 200.

At S380, the certificate issuance requester may deliver his or her own public key together with the certificate issuance request. In addition, the certificate issued at S390 may be included and stored in the blockchain data of the blockchain platform 400.

According to an embodiment, the smart contract (SC') may generate a pair of a public key and a secret key of the certificate issuance requester. In this case, transmitting a secret key to the certificate issuance requester from the smart contract (SC') may use the same method as the related method of generating a pair of a public key and a secret key of the certificate issuance requester by the certificate authority and delivering the generated secret key to the certificate issuance requester.

The blockchain platform-based authentication service illustrated in FIG. 3 may be provided through a decentralized application (hereinafter referred to as 'DApp'). The decentralized application refers to an application that can provide a specific service by using the smart contract based on the blockchain platform without the intervention of a centralized server.

A user may transmit a transaction for receiving the blockchain platform-based authentication service to the smart contract (SC') through a dedicated application executed on the computing devices 100 and 200, receive the result, and provide the same to another user. For example, the user may transmit the transaction of certificate issuance request described above to the smart contract (SC') through a dedicated application executed on the computing devices 100 and 200, and receive the issued certificate as a result. The dedicated application may be implemented with a DApp-enabled browser such as mist, metamask, and so on.

The embodiments described above may be implemented as a hardware component, a software component, and/or a combination of a hardware component and a software component. For example, the devices, methods, and components described in the embodiments may be implemented by using one or more general computer or specific-purpose computer such as a processor, a controller, an arithmetic logic unit (ALU), a digital signal processor, a microcomputer, a field programmable gate array (FPGA), a programmable logic unit (PLU), a microprocessor, or any other device capable of executing instructions and responding thereto. The processing device may execute an operating system (OS) and one or more software applications executed on the operating system. Further, the processing device may access, store, operate, process, and generate data in response to the execution of software. For convenience of understanding, although it is described in certain examples that one processing device is used, one of ordinary skill in the art may understand that the processing device may include a plurality of processing elements and/or a plurality of types of processing elements. For example, the processing device may include a plurality of processors or one processor and one controller. In addition, other processing configurations such as a parallel processor are possible.

The software may include a computer program, code, instructions, or a combination of one or more of the above, and may configure the processing unit, or instruct the processing unit independently or collectively to operate as desired. Software and/or data may be interpreted by the processing device or, in order to provide instructions or data to the processing device, may be embodied in any type of machine, component, physical device, virtual equipment, computer storage medium or device, or signal wave transmission, permanently or temporarily. The software may be distributed over networked computer systems and stored or executed in a distributed manner. The software and data may be stored on one or more computer-readable recording media.

The method according to the embodiments may be implemented in the form of program instructions that can be executed through various computer means and recorded in a computer-readable medium. The computer readable medium may include program instructions, data files, data structures, and the like alone or in combination. The program instructions recorded on the medium may be those specially designed and configured for the purposes of the embodiments, or may be known and available to those skilled in computer software. Examples of computer readable recording medium include magnetic media such as hard disks, floppy disks, and magnetic tape, optical media such as CD-ROMs and DVDs, magneto-optical media such as floptical disks, and hardware devices specifically configured to store and execute program instructions such as ROM, RAM, flash memory, and the like. Examples of the program instructions include machine language codes such as those generated by a compiler, as well as high-level language codes that may be executed by a computer using an interpreter, and so on. The hardware device described above may be configured to operate as one or more software modules in order to perform the operations according to the embodiments, and vice versa.

As described above, although the embodiments have been described with reference to the limited drawings, a person of ordinary skill in the art can apply various technical modifications and variations based on the above. For example, even when the described techniques are performed in an order different from the described method, and/or even when the components of the system, structure, device, circuit, and the like are coupled or combined in a form different from the way described, or replaced or substituted by other components or equivalents, an appropriate result can be achieved.

What is claimed is:

1. A system for a blockchain platform-based service, the system comprising at least one processor coupled to a storage device storing instructions, the instructions in response to execution by the at least one processor implementing:
    a smart contract that is deployed on a blockchain platform and generates a pair of a first private key and a first public key; and
    a first computing device that receives the first public key generated in the smart contract and transmits data encrypted with the first public key to the smart contract, wherein
    the smart contract decrypts the data encrypted with the first public key with the first private key, and stores the data decrypted with the first private key as a local variable of the smart contract.

2. The system of claim 1, wherein the data encrypted with the first public key is a private key of a certificate authority.

3. The system of claim 2, wherein the smart contract issues a certificate that is electronically signed with the private key of the certificate authority stored as the local variable of the smart contract to the blockchain platform.

4. The system of claim 3, wherein the smart contract receives personal information and a public key of a certificate issuance requester from a second computing device, and issues the certificate by electronically signing a certificate including personal information and a public key of the certificate issuance requester with the private key of the certificate authority.

5. The system of claim 3, wherein the smart contract stores the issued certificate in the blockchain platform.

6. A method for a blockchain platform-based service, comprising:
    generating, at a smart contract deployed on a blockchain platform, a pair of a first private key and a first public key;
    transmitting the first public key generated at the smart contract to a first computing device;
    receiving, at the smart contract, data encrypted with the first public key at the first computing device;
    decrypting, at the smart contract, the encrypted data with the first private key; and
    storing, at the smart contract, the data decrypted with the first private key as a local variable of the smart contract.

7. The method of claim 6, wherein the data encrypted with the first public key is a private key of a certificate authority.

8. The method of claim 7, wherein the smart contract issues a certificate that is electronically signed with the private key of the certificate authority stored as the local variable of the smart contract to the blockchain platform.

9. The method of claim 8, wherein the smart contract receives personal information and a public key of a certificate issuance requester from a second computing device, and issues the certificate by electronically signing a certificate including personal information and a public key of the certificate issuance requester with the private key of the certificate authority.

10. The method of claim 8, wherein the smart contract stores the issued certificate in the blockchain platform.

* * * * *